US010540656B2

(12) United States Patent
Mohammed et al.

(10) Patent No.: US 10,540,656 B2
(45) Date of Patent: *Jan. 21, 2020

(54) COMMUNICATION PROTOCOLS FOR PROCESSING AN AUTHORIZATION REQUEST IN A DISTRIBUTED COMPUTING SYSTEM

(71) Applicant: Visa International Service Association, San Francisco, CA (US)

(72) Inventors: Sayeed Mohammed, Foster City, CA (US); Joseph Bjorn Ovick, San Francisco, CA (US); Nancy L. Kim, San Francisco, CA (US); Diane C. Salmon, Lafayette, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,813

(22) Filed: Mar. 13, 2019

(65) Prior Publication Data

US 2019/0213591 A1 Jul. 11, 2019

Related U.S. Application Data

(63) Continuation of application No. 15/601,852, filed on May 22, 2017, now Pat. No. 10,275,770, which is a
(Continued)

(51) Int. Cl.
*G06Q 20/40* (2012.01)
*G06Q 20/22* (2012.01)
*G06Q 20/10* (2012.01)

(52) U.S. Cl.
CPC .......... *G06Q 20/401* (2013.01); *G06Q 20/10* (2013.01); *G06Q 20/22* (2013.01)

(58) Field of Classification Search
CPC ...... G06Q 20/10; G06Q 20/22; G06Q 20/401; H04L 47/80; H04L 47/828; H04L 67/10
See application file for complete search history.

(56) References Cited

U.S. PATENT DOCUMENTS

| 4,941,090 A | 7/1990 | McCarthy |
| 5,025,372 A | 6/1991 | Burton et al. |

(Continued)

FOREIGN PATENT DOCUMENTS

| JP | 2003502763 A | 1/2003 |
| JP | 2004303015 A | 10/2004 |

(Continued)

OTHER PUBLICATIONS

Nerger, "Evening the odds: CRM systems are driving sophisticated loyalty programs at Las Vegas Casinos—and not just for the high rollers", Mar. 1, 2002, 7 pages.

*Primary Examiner* — Laura A Gudorf
(74) *Attorney, Agent, or Firm* — The Webb Law Firm

(57) ABSTRACT

Systems and methods implementing a communication protocol for the authorization of transfer of resources in a computer system having a plurality of computers, including a centralized router connecting to source account controllers and destination account controllers that are connected to readers. A reader communicates a first authorization request having a source identifier to a portal coupled with a data storage storing data linking the source identifier to a linked identifier. The portal communicates with a respective linked account controller to obtain a response identifying an available resource. Based on the response, the reader generates a further authorization request for a requested resource from a source account identified by the source identifier to a destination account associated with the reader.

20 Claims, 8 Drawing Sheets

Related U.S. Application Data continuation of application No. 14/656,221, filed on Mar. 12, 2015, now Pat. No. 9,672,516.

(60) Provisional application No. 61/952,820, filed on Mar. 13, 2014.

(56) References Cited

U.S. PATENT DOCUMENTS

| | | | |
|---|---|---|---|
| 5,117,355 A | 5/1992 | McCarthy | |
| 5,202,826 A | 4/1993 | McCarthy | |
| 5,287,268 A | 2/1994 | McCarthy | |
| 5,465,206 A | 11/1995 | Hilt et al. | |
| 5,477,038 A | 12/1995 | Levine et al. | |
| 5,530,232 A | 6/1996 | Taylor | |
| 5,621,201 A | 4/1997 | Langhans et al. | |
| 5,689,100 A | 11/1997 | Carrithers et al. | |
| 5,774,870 A | 6/1998 | Storey | |
| RE36,116 E | 2/1999 | McCarthy | |
| 5,923,016 A | 7/1999 | Fredregill et al. | |
| 5,937,391 A | 8/1999 | Ikeda et al. | |
| 5,956,694 A | 9/1999 | Powell | |
| 6,032,136 A | 2/2000 | Brake, Jr. et al. | |
| 6,055,512 A | 4/2000 | Dean et al. | |
| 6,101,477 A | 8/2000 | Hohle et al. | |
| 6,129,274 A | 10/2000 | Suzuki | |
| 6,138,911 A | 10/2000 | Fredregill et al. | |
| 6,243,687 B1 | 6/2001 | Powell | |
| 6,247,129 B1 | 6/2001 | Keathley et al. | |
| 6,251,017 B1 | 6/2001 | Leason et al. | |
| 6,332,126 B1 | 12/2001 | Peirce et al. | |
| 6,334,108 B1 | 12/2001 | Deaton et al. | |
| 6,336,099 B1 | 1/2002 | Barnett et al. | |
| 6,341,353 B1 | 1/2002 | Herman et al. | |
| 6,408,286 B1 | 6/2002 | Heiden | |
| 6,450,407 B1 | 9/2002 | Freeman et al. | |
| 6,560,581 B1 | 5/2003 | Fox et al. | |
| 6,571,216 B1 | 5/2003 | Garg et al. | |
| 6,594,640 B1 | 7/2003 | Postrel | |
| 6,606,745 B2 | 8/2003 | Maggio | |
| 6,663,105 B1 | 12/2003 | Sullivan et al. | |
| 6,721,743 B1 | 4/2004 | Sakakibara | |
| 6,741,968 B2 | 5/2004 | Jacoves et al. | |
| 6,748,365 B1 | 6/2004 | Quinlan et al. | |
| 6,820,061 B2 | 11/2004 | Postrel | |
| 6,829,586 B2 | 12/2004 | Postrel | |
| 6,842,739 B2 | 1/2005 | Postrel | |
| 6,856,820 B1 | 2/2005 | Kolls | |
| 6,865,547 B1 | 3/2005 | Brake, Jr. et al. | |
| 6,947,898 B2 | 9/2005 | Postrel | |
| 6,978,250 B1 | 12/2005 | Kawan et al. | |
| 7,054,830 B1 | 5/2006 | Eggleston et al. | |
| 7,072,864 B2 | 7/2006 | Brake, Jr. et al. | |
| 7,096,190 B2 | 8/2006 | Postrel | |
| 7,134,087 B2 | 11/2006 | Bushold et al. | |
| 7,163,145 B2 | 1/2007 | Cohagan et al. | |
| 7,263,507 B1 | 8/2007 | Brake, Jr. et al. | |
| 7,370,811 B2 | 5/2008 | Turner et al. | |
| 7,376,580 B1 | 5/2008 | Walker et al. | |
| 7,398,225 B2 | 7/2008 | Voltmer et al. | |
| 7,424,617 B2 | 9/2008 | Boyd et al. | |
| 7,428,498 B2 | 9/2008 | Voltmer et al. | |
| 7,606,730 B2 | 10/2009 | Antonucci | |
| 7,624,041 B2 | 11/2009 | Postrel | |
| 7,665,660 B2 | 2/2010 | Degliantoni et al. | |
| 7,680,688 B2 | 3/2010 | Hessburg et al. | |
| 7,686,218 B2 | 3/2010 | Hessburg et al. | |
| 7,742,943 B2 | 6/2010 | Postrel | |
| 7,753,264 B2 | 7/2010 | Shafer et al. | |
| 7,765,124 B2 | 7/2010 | Postrel | |
| 7,769,630 B2 | 8/2010 | Postrel | |
| 7,777,053 B2 | 8/2010 | Sanganbhatla et al. | |
| 7,828,206 B2 | 11/2010 | Hessburg et al. | |
| 7,853,529 B1 | 12/2010 | Walker et al. | |
| 7,868,218 B2 | 1/2011 | Clark et al. | |
| 7,870,022 B2 | 1/2011 | Bous et al. | |
| 7,894,634 B2 | 2/2011 | Chung | |
| 8,010,405 B1 | 8/2011 | Bortolin et al. | |
| 8,046,256 B2 | 10/2011 | Chien et al. | |
| 8,155,999 B2 | 4/2012 | de Boer et al. | |
| 8,180,671 B2 | 5/2012 | Cohagan et al. | |
| 8,265,993 B2 | 9/2012 | Chien et al. | |
| 8,285,643 B2 | 10/2012 | Isaacson et al. | |
| 8,301,593 B2 | 10/2012 | Hoffmann et al. | |
| 8,302,030 B2 | 10/2012 | Soroca et al. | |
| 8,313,023 B1 | 11/2012 | McGhie et al. | |
| 8,315,929 B2 | 11/2012 | Allen-Rouman et al. | |
| 8,332,290 B1 | 12/2012 | Venturo et al. | |
| 8,342,399 B1 | 1/2013 | McGhie et al. | |
| 8,401,967 B1 | 3/2013 | Postrel | |
| 8,478,640 B2 | 7/2013 | Postrel | |
| 8,511,550 B1 | 8/2013 | McGhie et al. | |
| 8,682,791 B2 | 3/2014 | Bies et al. | |
| 8,880,431 B2 | 11/2014 | Ovick et al. | |
| 9,672,516 B2 | 6/2017 | Mohammed et al. | |
| 2001/0016827 A1 | 8/2001 | Fernandez | |
| 2001/0054003 A1 | 12/2001 | Chien et al. | |
| 2002/0026348 A1 | 2/2002 | Fowler et al. | |
| 2002/0046116 A1 | 4/2002 | Hohle et al. | |
| 2002/0062249 A1 | 5/2002 | Iannacci | |
| 2002/0082920 A1 | 6/2002 | Austin et al. | |
| 2002/0160761 A1 | 10/2002 | Wolfe | |
| 2003/0004808 A1 | 1/2003 | Elhaoussine et al. | |
| 2003/0040964 A1 | 2/2003 | Lacek | |
| 2003/0158818 A1 | 8/2003 | George et al. | |
| 2003/0212626 A1 | 11/2003 | Vulkan | |
| 2003/0216967 A1 | 11/2003 | Williams | |
| 2003/0225618 A1 | 12/2003 | Hessburg et al. | |
| 2003/0236704 A1 | 12/2003 | Antonucci | |
| 2003/0236712 A1 | 12/2003 | Antonucci et al. | |
| 2004/0049423 A1 | 3/2004 | Kawashima et al. | |
| 2004/0083170 A1 | 4/2004 | Bam et al. | |
| 2004/0088376 A1 | 5/2004 | McCanne et al. | |
| 2004/0104760 A1 | 6/2004 | Ando | |
| 2004/0117250 A1 | 6/2004 | Lubow et al. | |
| 2004/0133472 A1 | 7/2004 | Leason et al. | |
| 2004/0138949 A1 | 7/2004 | Darnton et al. | |
| 2004/0148224 A1 | 7/2004 | Gauthier et al. | |
| 2004/0186773 A1 | 9/2004 | George et al. | |
| 2004/0203648 A1 | 10/2004 | Wong | |
| 2004/0238622 A1 | 12/2004 | Freiberg | |
| 2004/0249710 A1 | 12/2004 | Smith et al. | |
| 2004/0260608 A1 | 12/2004 | Lewis et al. | |
| 2005/0010533 A1 | 1/2005 | Cooper | |
| 2005/0021399 A1 | 1/2005 | Postrel | |
| 2005/0021401 A1 | 1/2005 | Postrel | |
| 2005/0055272 A1 | 3/2005 | Ryan et al. | |
| 2005/0060225 A1 | 3/2005 | Postrel | |
| 2005/0071225 A1 | 3/2005 | Bortolin et al. | |
| 2005/0071227 A1 | 3/2005 | Hammad et al. | |
| 2005/0080727 A1 | 4/2005 | Postrel | |
| 2005/0091152 A1 | 4/2005 | Suisa | |
| 2005/0114213 A1 | 5/2005 | Smith et al. | |
| 2005/0119938 A1 | 6/2005 | Smith et al. | |
| 2005/0149394 A1 | 7/2005 | Postrel | |
| 2005/0205666 A1 | 9/2005 | Ward et al. | |
| 2005/0240472 A1 | 10/2005 | Postrel | |
| 2005/0240478 A1 | 10/2005 | Lubow et al. | |
| 2006/0010033 A1 | 1/2006 | Thomas | |
| 2006/0020511 A1 | 1/2006 | Postrel | |
| 2006/0053056 A1 | 3/2006 | Alspach-Goss et al. | |
| 2006/0059040 A1 | 3/2006 | Eldred et al. | |
| 2006/0129456 A1 | 6/2006 | Walker et al. | |
| 2006/0136299 A1 | 6/2006 | Ruhmkorf | |
| 2006/0184419 A1 | 8/2006 | Postrel | |
| 2006/0190337 A1 | 8/2006 | Ayers, Jr. et al. | |
| 2006/0206376 A1 | 9/2006 | Gibbs et al. | |
| 2006/0208065 A1 | 9/2006 | Mendelovich et al. | |
| 2006/0253321 A1 | 11/2006 | Heywood | |
| 2006/0259364 A1 | 11/2006 | Stock et al. | |
| 2006/0287943 A1 | 12/2006 | Postrel | |
| 2007/0005416 A1 | 1/2007 | Jackson et al. | |
| 2007/0011044 A1 | 1/2007 | Hansen | |
| 2007/0038515 A1 | 2/2007 | Postrel | |
| 2007/0043619 A1 | 2/2007 | Leason et al. | |

(56) References Cited

U.S. PATENT DOCUMENTS

| | | |
|---|---|---|
| 2007/0043620 A1 | 2/2007 | Leason et al. |
| 2007/0078719 A1 | 4/2007 | Schmitt et al. |
| 2007/0100691 A1 | 5/2007 | Patterson |
| 2007/0112629 A1 | 5/2007 | Solomon et al. |
| 2007/0129955 A1 | 6/2007 | Dalmia et al. |
| 2007/0129998 A1 | 6/2007 | Postrel |
| 2007/0130011 A1 | 6/2007 | Postrel |
| 2007/0143178 A1 | 6/2007 | Citrin et al. |
| 2007/0192784 A1 | 8/2007 | Postrel |
| 2007/0198338 A1 | 8/2007 | Heywood |
| 2007/0214049 A1 | 9/2007 | Postrel |
| 2007/0226059 A1 | 9/2007 | Postrel |
| 2007/0260509 A1 | 11/2007 | Hines et al. |
| 2007/0288313 A1 | 12/2007 | Brodson et al. |
| 2008/0010154 A1 | 1/2008 | Tietzen et al. |
| 2008/0021784 A1 | 1/2008 | Hessburg et al. |
| 2008/0040222 A1 | 2/2008 | Gee |
| 2008/0040270 A1 | 2/2008 | Buchheit et al. |
| 2008/0059303 A1 | 3/2008 | Fordyce |
| 2008/0071640 A1 | 3/2008 | Nguyen |
| 2008/0077499 A1 | 3/2008 | Ariff et al. |
| 2008/0103968 A1 | 5/2008 | Bies et al. |
| 2008/0120221 A1 | 5/2008 | Toneguzzo |
| 2008/0133350 A1 | 6/2008 | White et al. |
| 2008/0133351 A1 | 6/2008 | White et al. |
| 2008/0147534 A1 | 6/2008 | Ephrati et al. |
| 2008/0154676 A1 | 6/2008 | Suk |
| 2008/0154722 A1 | 6/2008 | Galinos |
| 2008/0162318 A1* | 7/2008 | Butler .................... G06Q 20/06 705/35 |
| 2008/0177627 A1 | 7/2008 | Cefail |
| 2008/0201224 A1 | 8/2008 | Owens et al. |
| 2008/0228563 A1 | 9/2008 | Zellner et al. |
| 2008/0228583 A1 | 9/2008 | MacDonald et al. |
| 2008/0249861 A1 | 10/2008 | Carotta et al. |
| 2008/0313034 A1 | 12/2008 | Wise |
| 2009/0006203 A1 | 1/2009 | Fordyce, III et al. |
| 2009/0018909 A1 | 1/2009 | Grecia |
| 2009/0030793 A1 | 1/2009 | Fordyce, III |
| 2009/0048916 A1 | 2/2009 | Nuzum et al. |
| 2009/0076911 A1 | 3/2009 | Vo et al. |
| 2009/0076912 A1 | 3/2009 | Rajan et al. |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112721 A1 | 4/2009 | Hammad et al. |
| 2009/0176580 A1 | 7/2009 | Herrmann et al. |
| 2009/0198572 A1 | 8/2009 | Jurgens |
| 2009/0271262 A1 | 10/2009 | Hammad |
| 2009/0307118 A1 | 12/2009 | Baumgartner |
| 2009/0307130 A1 | 12/2009 | Tan |
| 2010/0010901 A1 | 1/2010 | Marshall et al. |
| 2010/0030688 A1 | 2/2010 | Patterson |
| 2010/0042517 A1 | 2/2010 | Paintin et al. |
| 2010/0051691 A1 | 3/2010 | Brooks et al. |
| 2010/0057551 A1 | 3/2010 | Blaisdell |
| 2010/0057553 A1 | 3/2010 | Ameiss et al. |
| 2010/0075638 A1 | 3/2010 | Carlson et al. |
| 2010/0076820 A1 | 3/2010 | Davis |
| 2010/0125737 A1 | 5/2010 | Kang |
| 2010/0145855 A1 | 6/2010 | Fordyce, III et al. |
| 2010/0174596 A1 | 7/2010 | Gilman et al. |
| 2010/0211445 A1 | 8/2010 | Bodington |
| 2010/0211469 A1 | 8/2010 | Salmon et al. |
| 2010/0274659 A1 | 10/2010 | Antonucci et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1 | 1/2011 | Strock et al. |
| 2011/0022514 A1 | 1/2011 | Lal et al. |
| 2011/0047019 A1 | 2/2011 | Cervenka et al. |
| 2011/0066483 A1 | 3/2011 | Salmon et al. |
| 2011/0082739 A1 | 4/2011 | Pourfallah |
| 2011/0087530 A1 | 4/2011 | Fordyce, III et al. |
| 2011/0087531 A1 | 4/2011 | Winters et al. |
| 2011/0145148 A1 | 6/2011 | Hammad |
| 2011/0161230 A1 | 6/2011 | Singh |
| 2011/0218868 A1 | 9/2011 | Young et al. |
| 2011/0231258 A1 | 9/2011 | Winters |
| 2011/0238483 A1 | 9/2011 | Yoo et al. |
| 2011/0276493 A1 | 11/2011 | Graham, III et al. |
| 2011/0276495 A1 | 11/2011 | Varadarajan et al. |
| 2011/0288918 A1 | 11/2011 | Cervenka et al. |
| 2011/0288924 A1 | 11/2011 | Thomas et al. |
| 2011/0295675 A1 | 12/2011 | Reodica |
| 2012/0010940 A1 | 1/2012 | Masi |
| 2012/0035998 A1 | 2/2012 | Chien et al. |
| 2012/0041812 A1 | 2/2012 | Postrel |
| 2012/0101881 A1 | 4/2012 | Taylor et al. |
| 2012/0123849 A1 | 5/2012 | Armstrong |
| 2012/0179531 A1 | 7/2012 | Kim |
| 2012/0191525 A1 | 7/2012 | Singh et al. |
| 2012/0215610 A1 | 8/2012 | Amaro et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239417 A1 | 9/2012 | Pourfallah et al. |
| 2012/0239477 A1 | 9/2012 | Cueli et al. |
| 2012/0245987 A1 | 9/2012 | Isaacson et al. |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0290950 A1 | 11/2012 | Rapaport et al. |
| 2012/0303425 A1 | 11/2012 | Katzin et al. |
| 2012/0316945 A1 | 12/2012 | Wolf et al. |
| 2012/0323663 A1 | 12/2012 | Leach |
| 2013/0006848 A1 | 1/2013 | Kuttuva |
| 2013/0060679 A1 | 3/2013 | Oskolkov et al. |
| 2013/0124278 A1 | 5/2013 | Najm |
| 2013/0151323 A1 | 6/2013 | Shepard et al. |
| 2013/0151401 A1 | 6/2013 | Scipioni et al. |
| 2013/0268333 A1 | 10/2013 | Ovick et al. |
| 2013/0282461 A1 | 10/2013 | Ovick et al. |
| 2014/0222533 A1 | 8/2014 | Ovick et al. |
| 2015/0088626 A1 | 3/2015 | Salmon et al. |
| 2015/0088633 A1 | 3/2015 | Salmon et al. |
| 2015/0142655 A1* | 5/2015 | Ghosh .................... G06Q 20/20 705/44 |
| 2015/0199660 A1* | 7/2015 | Dolan .................... G06Q 20/10 705/37 |
| 2015/0262177 A1 | 9/2015 | Mohammed et al. |

FOREIGN PATENT DOCUMENTS

| | | |
|---|---|---|
| KR | 20010083521 A | 9/2001 |
| KR | 20010096673 A | 11/2001 |
| KR | 20020050219 A | 6/2002 |
| KR | 20030080111 A | 10/2003 |
| KR | 1020040016771 A | 2/2004 |
| KR | 20040028110 A | 4/2004 |
| KR | 1020040040253 A | 5/2004 |
| KR | 1020040077077 A | 9/2004 |
| KR | 1020050061661 A | 6/2005 |
| KR | 20060101241 A | 9/2006 |
| KR | 100717590 B1 | 5/2007 |
| KR | 1020070110241 A | 11/2007 |
| KR | 100836484 B1 | 6/2008 |
| KR | 20080102439 A | 11/2008 |
| MX | PA01013136 A | 6/2004 |
| WO | 0079461 A1 | 12/2000 |
| WO | 2005022342 A2 | 3/2005 |
| WO | 2006121541 A1 | 11/2006 |
| WO | 2008016923 A2 | 2/2008 |
| WO | 2008102935 A1 | 8/2008 |
| WO | 2010093893 A2 | 8/2010 |

(56) References Cited

FOREIGN PATENT DOCUMENTS

| | | | |
|---|---|---|---|
| WO | 2010135642 | A2 | 11/2010 |
| ZA | 200200475 | B | 6/2003 |

\* cited by examiner

COMMUNICATION PROTOCOLS FOR PROCESSING AN AUTHORIZATION REQUEST IN A DISTRIBUTED COMPUTING SYSTEM

RELATED APPLICATIONS

This application is a continuation application of U.S. patent application Ser. No. 15/601,852, filed May 22, 2017, which is a continuation of U.S. patent application Ser. No. 14/656,221, filed Mar. 12, 2015, and issued as U.S. Pat. No. 9,672,516 on Jun. 6, 2017, which claims priority to U.S. Provisional Patent Application No. 61/952,820, filed Mar. 13, 2014, the disclosures of which are hereby incorporated by reference in their entireties.

FIELD OF THE TECHNOLOGY

At least some embodiments presented in the disclosure relate to a computing system having a plurality of computers connected via one or more networks in general and, more particularly but not limited to, protocols for communication among a plurality of computers for authorization of resource transfer.

BACKGROUND

The Internet provides a communication channel for flexible communication connections among various computing devices connected to it. For example, web browsers running in computing devices may access web servers via standardized communication protocols, such as Hypertext Transfer Protocol (HTTP), Hypertext Transfer Protocol Secure (HTTPS), File Transfer Protocol (FTP), etc.

For security reasons, reliability reasons, and/or other reasons, certain computers are interconnected via propriety networks and/or dedicated network connections. For example, certain computers configured with high security considerations may be connected via dedicated network connections. For example, financial transaction card originated messages transmitted in accordance with ISO 8583 are generally propagated in secure networks.

Combining existing propriety networks and/or dedicated network connections with open connections offered by the Internet may offer advantages in some instances.

BRIEF DESCRIPTION OF THE DRAWINGS

The embodiments are illustrated by way of example and not limitation in the figures of the accompanying drawings in which like references indicate similar elements.

DETAILED DESCRIPTION

In one embodiment, a communication protocol is provided in a computing system having multiple computers connected via multiple networks to facilitate the authorization of the transfer of resources among accounts.

Figure 1:
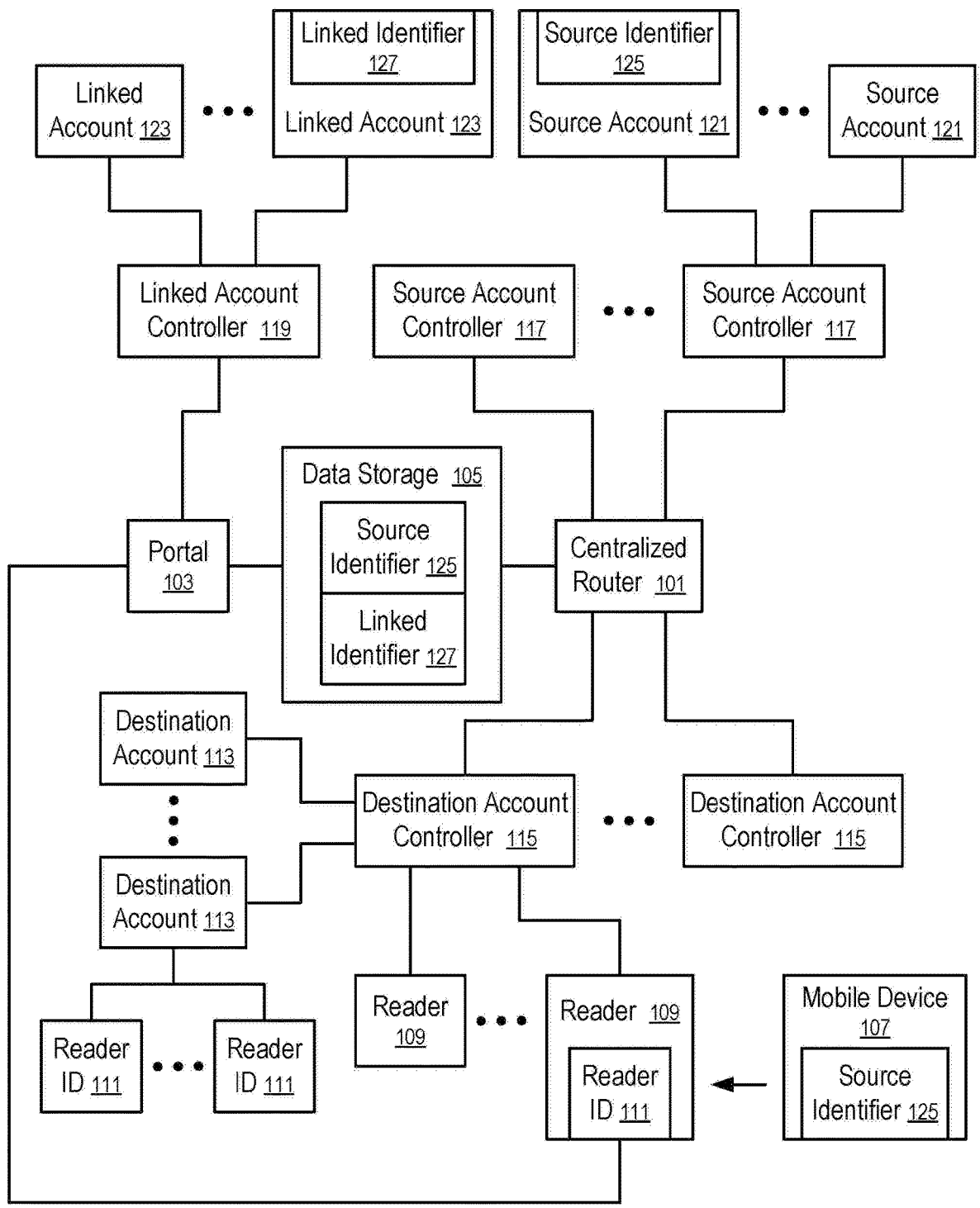
FIG. 1 shows a computing system in which communication techniques of embodiments disclosed herein can be used.

FIG. 1 shows a computing system in which communication techniques of embodiments disclosed herein can be used.

In FIG. 1, resources can be transferred from source accounts (121) and linked accounts (123) to destination accounts (113) in response to interactions between mobile devices (107) that present source identifiers (125) and readers (109) that are associated with destination accounts (113).

In FIG. 1, the destination account controllers (115) are computers that control destination accounts (113). Each of the destination account controllers (115) controls their respective sets of one or more destination accounts (113). Each destination account (113) is associated with one or more reader IDs (111) of readers (109). Each reader (109) has a unique reader ID (111) that can be used to identify the destination account (113) represented by the reader (109). Thus, when an authorization request for a resource transfer is originated in a reader (109) that has a reader ID (111) and that is connected to a destination controller (115), the authorization request is considered for a transfer to a destination account (113) that is controlled by the destination controller (115) and that is associated with the corresponding reader ID (111).

In FIG. 1, the source accounts controllers (117) are computers that control source accounts (121). Each of the source account controller (117) controls their respective set of one or more source accounts (121). Each of the source accounts (121) in the system is uniquely identified by a source identifier (125). Each of the mobile devices (107) is configured to present a source identifier (125) to any of the readers (109) during a communication interaction.

In a communication interaction between a mobile device (107) and a reader (109), the reader (109) obtains the source identifier (125) from the mobile device (107) and generates an authorization request for the transfer of resources from the source account (121) identified by the source identifier (125) obtained from the mobile device (107) to a destination account (113) identified by the reader (109) having the reader ID (111) and connected to the destination account controller (115) of the respective destination account (113) that is associated with the same reader ID (111).

In FIG. 1, the authorization request is to be approved by the centralized router (101) and/or the respective source account (121) having the source identifier (125) in accordance with predetermined security policies.

In FIG. 1, the centralized router (101) is a set of one or more computers coupled between the source account controllers (117) and the destination account controllers (115). Each of the destination account controllers (115) is connected to the centralized router (101) to communicate authorization requests to the centralized router (101) and to receive from the centralized router (101) respective authorization responses corresponding to the respective authorization requests.

In FIG. 1, each of the source account controllers (117) is connected to the centralized router (101) to receive authorization requests from the centralized router (101) and to transmit to the centralized router (101) respective authorization responses corresponding to the respective authorization requests.

In FIG. 1, the centralized router (101) routes the authorization requests for transfers from source accounts (121) identified by respective source identifiers (125) to respective source account controllers (117) based on the association between the source account controllers and the source identifiers (125).

In FIG. 1, the centralized router (101) routes the authorization responses for transfers to destination accounts (113) to respective destination account controllers (115) based on the identification information of the destination account controllers (115) and/or the destination accounts (113) that are received in respective authorization requests.

Thus, the centralized router (101) routes an authorization request, originated by a reader (109) interacting with a mobile device (107) having the source identifier (125), from a destination account controller (115) connected to the reader (109) to the source account controller (117) identified by the source identifier (125), receives the authorization response from the source account controller (117) and routes the authorization response back to the respective destination account controller (115), which provides the authorization response to the respective reader (109). In one embodiment, the communication messages between the centralized router (101) and the source account controllers (117) or the destination account controllers (115) are in accordance with a publish standard to support interoperability, such as ISO 8583.

In one embodiment, each of the reader (109) is a separate computer disposed at a different location. A mobile device (107) is configured with a source identifier (125) to be read by the reader (109), e.g., via scanning using laser, reading a magnetic data strip mounted on a plastic card, reading via near field communications. In some instances, the source identifier (125) may be read by a person and entered manually in the reader (109) via a keypad.

In FIG. 1, a portal (103) is provided to allow a direct connection to a reader (109) without going through its destination controller (115). For example, the reader (109) may establish a connection with the portal (103) over Internet, without using the network connection between the reader (109) and its destination account controller (115). For example, the reader (109) can be configured to communicate with the portal (103) over the Internet using Hypertext Transfer Protocol (HTTP), Hypertext Transfer Protocol Secure (HTTPS), File Transfer Protocol (FTP), etc.

In FIG. 1, the portal (103) is a set of one or more computers separate from the centralized router (101). However, the portal (103) is connected with the centralized route (101) (e.g., via an intranet) for secure data communications.

In FIG. 1, both the centralized router (101) and the portal (103) have access to the shared data storage (105) that at least stores data associating a source identifier (125) with a linked identifier (127).

In FIG. 1, the storing of the data in the data storage (105) linking the source identifier (125) and the linked identifier (127) allows the initiation of the transfer from a linked account (123) when the mobile device (107) presents the source identifier (125) but not the linked identifier (127).

In FIG. 1, a linked account controller (119) is a separate computer that controls a set of one or more linked accounts (123). Each of the linked accounts (123) is identified by its linked identifier (127).

FIG. 1 illustrates an example of one linked account controller (119). However, the system can be expanded to include multiple linked account controllers (119), each controlling a separate set of linked accounts (123).

In one embodiment, the linked account controller (119) is connected to the portal (103) via Internet (or a dedicated secure connection). Alternatively or in combination, the linked account controller (119) may be connected to the centralized router (101) in a way similar to the connection between a source account controller (117) and the centralized router (101). In some instances, the linked account controller (119) is one of the source account controller (117) and controls a set of source accounts (121).

At least some embodiments presented in the disclosure provide communication protocols for the multiple computers, connected via the various network connections illustrated in FIG. 1, to process an authorization request originated by the reader (109) reading the source identifier (125) from the mobile device (107), in view of the data stored in the data storage (105) linking the source identifier (125) to the linked identifier (127).

FIGS. 2-5 illustrate communication protocols for requesting authorization to transfer resources according to one embodiment. For example, the communication protocols illustrated in FIGS. 2-5 can be implemented in a system illustrated in FIG. 1 with or without the variations discussed above.

Figure 2:
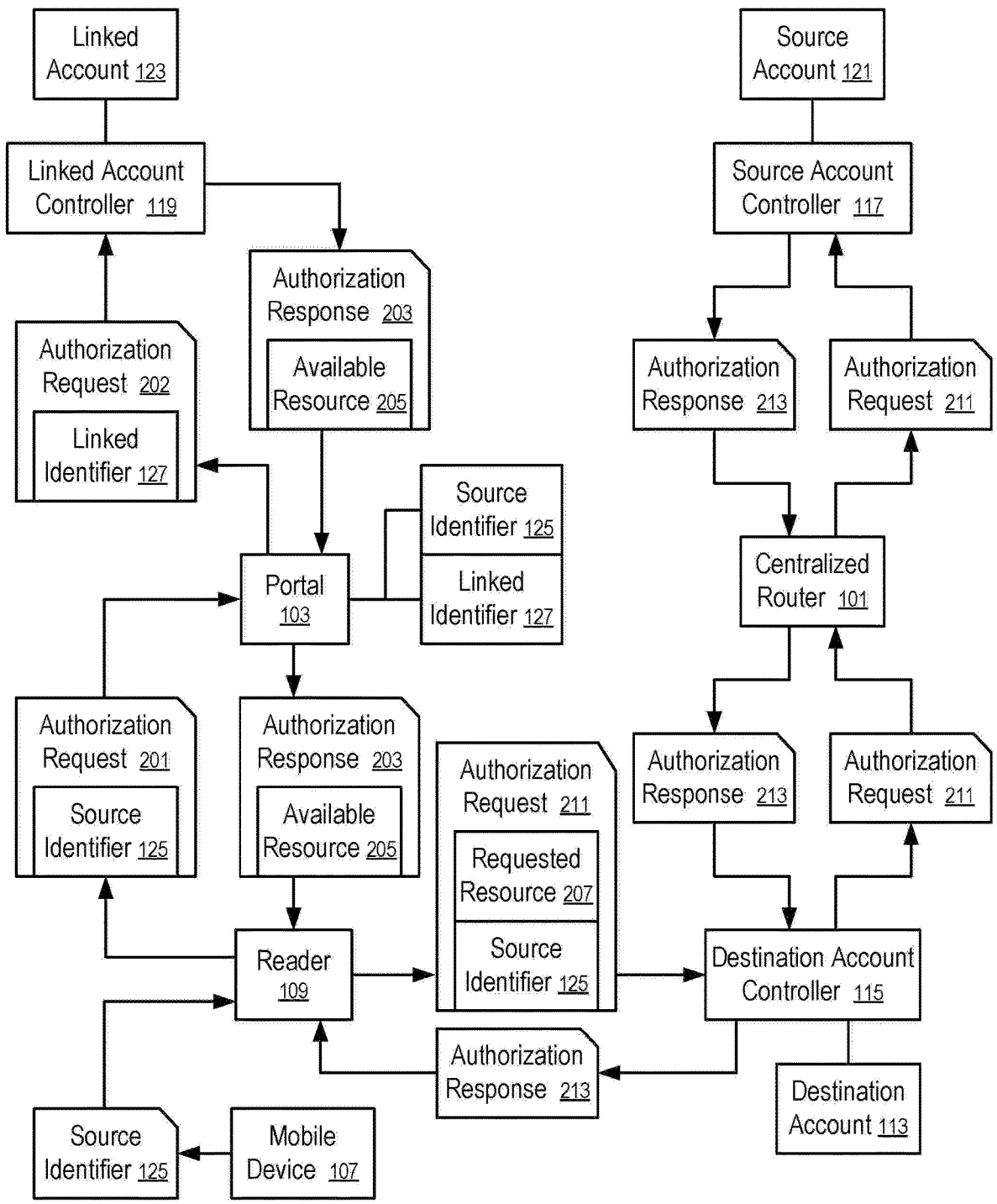
FIGS. 2-5 illustrate communication protocols for requesting authorization to transfer resources according to one embodiment.

In FIG. 2, after the mobile device (107) presents the source identifier (125) to the reader (109) to initiate a transfer of resources, the reader (109) sends a first authorization request (201) to the portal (103) without going through its destination account controller (115). The first authorization request (201) includes the source identifier (125) to indicate a source of the transfer.

Based on the data linking the source identifier (125) and the linked identifier (127), the portal (103) translates the first authorization request (201) to a second authorization request (202) that identifies the linked identifier (127) and routes the second authorization request (202) to the linked account controller (119) that controls the linked account (123) identified by the linked identifier (127).

Based on a predetermined set of rules, the linked account controller (119) provides an authorization response (203) that identifies the available resource (205) in the linked account (123). In one embodiment, the authorization response (203) authorizes the transfer of the available resource (205) from the linked account (123) to the destination account (113) associated with the reader (109) having the reader ID (111) and connected to the destination account controller (115).

In FIG. 2, the portal (103) routes the authorization response (203) back to the reader (109) via the direct connection between the portal (103) and the reader (109) (e.g., a connection established over the Internet or a dedicated connection, without going through the destination account controller (115)).

Based on the identification of the available resource (205) identified in the authorization response (203) from the linked account controller (119), the reader (109) determines a requested resource (207) and generates a third authorization request (211) transmitted to the destination account controller (115). The third authorization request (211) identifies the requested resource (207) and the source identifier (125) received from the mobile device (107). In one embodiment, the third authorization request (211) is generated by the reader (109) without reading the mobile device (107) again.

The destination account controller (115) routes the authorization request (211), via the centralized router (101), to the source account controller (117), for an authorization response (213) made by the source account controller (117) controlling the source account (121) identified by the source identifier (125).

The centralized router (101) routes the authorization request (211) received from the source account controller (117) back to the reader (109) via the destination account controller (115).

Thus, with a single communication interaction between the reader (109) and the mobile device (107) to initiate a transfer using the source identifier (125), the communication protocol allows the authorization of the transfer of resources from both the linked account (123) and the source account (121).

In some embodiments, the reader (109) may present the available resource (205) and receive a user input to accept or reject the transfer of the available resource (205) from the linked account (123) as part of the transfer of resources from the source account (121) identified by the source identifier (125). The requested resources (207) is then computed based on the user input in connection with the available resource (205) identified by the linked account controller (119).

Figure 3:
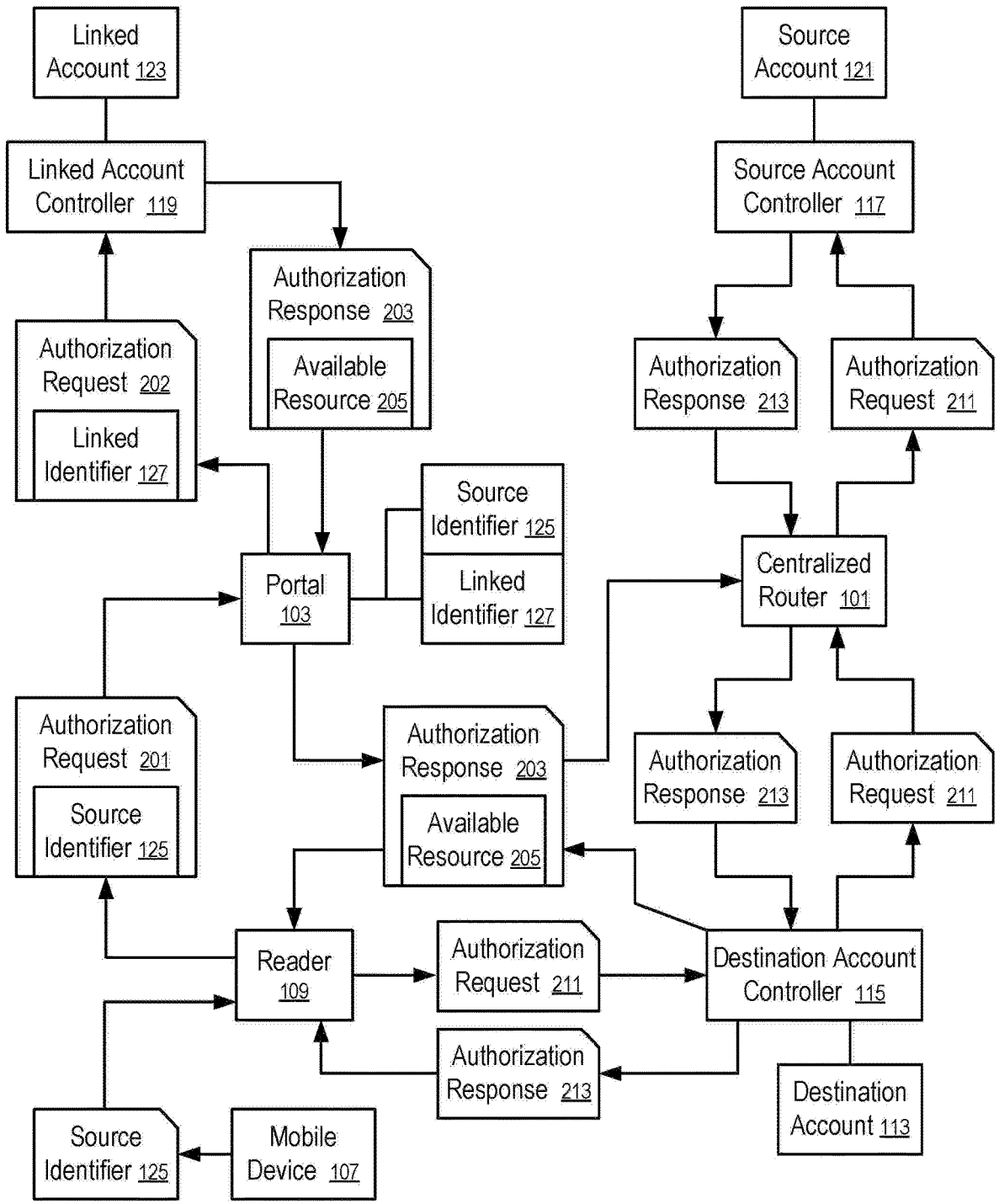

FIG. 3 shows an embodiment in which the authorization response (203) is routed back to the reader (109) via the destination account controller (115).

In FIG. 3, after the mobile device (107) presents the source identifier (125) to the reader (109) to initiate a transfer of resources, the reader (109) sends a first authorization request (201) to the portal (103) without going through its destination account controller (115) (e.g., using a connection established over the Internet or a dedicated connection, without going through the destination account controller (115)). The first authorization request (201) includes the source identifier (125) to indicate a source of the transfer.

Based on the data linking the source identifier (125) and the linked identifier (127), the portal (103) translates the first authorization request (201) to a second authorization request (202) that identifies the linked identifier (127) and routes the second authorization request (202) to the linked account controller (119) that controls the linked account (123) identified by the linked identifier (127).

Based on a predetermined set of rules, the linked account controller (119) provides an authorization response (203) that identifies the available resource (205) in the linked account (123). The authorization response (203) authorizes the transfer of the available resource (205) from the linked account (123) to the destination account (113) associated with the reader (109) having the reader ID (111) and connected to the destination account controller (115).

In FIG. 3, the portal (103) routes the authorization response (203) back to the reader (109) via the centralized router (101) and the destination account controller (115).

For example, based on an identifier of the reader (109) provided in the first authorization request (201), such as the reader ID (111), the portal (103) and/or the centralized router (101) determines the identity of the destination account controller (115) to which the reader (109) is connected. Thus, the portal (103) provides the authorization response (203) received from the linked account controller (119) to the centralized router (101), which then provides the authorization response (203) to the destination account controller (115) that is in control of the destination account (113) associated with the reader (109). Based on the reader ID (111) (e.g., initially provided in the first authorization request (201)), the destination account controller (115) routes the authorization response (203) back to the reader (109), which is in general as illustrated in FIG. 1 one of many readers (109) connected to the destination account controller (115) and/or associated with the destination account (113).

Based on the identification of the available resource (205) identified in the authorization response (203) from the linked account controller (119), the reader (109) determines a requested resource (207) and generates a third authorization request (211) transmitted to the destination account controller (115). The third authorization request (211) identifies the requested resource (207) and the source identifier (125) received from the mobile device (107). In one embodiment, the third authorization request (211) is generated by the reader (109) without reading the mobile device (107) again.

The destination account controller (115) routes the authorization request (211), via the centralized router (101), to the source account controller (117), for an authorization response (213) made by the source account controller (117) controlling the source account (121) identified by the source identifier (125).

The centralized router (101) routes the authorization request (211) received from the source account controller (117) back to the reader (109) via the destination account controller (115).

Since the destination account controller (115) is in the path of both the authorization responses (203) and (213) for the authorizations of the transfers from the linked accounts (123) and the source account (121), the destination account controller (115) is in a better and informed position to request actual transfer of resources from the linked accounts (123) and the source account (121) to the destination account (113).

Figure 4:
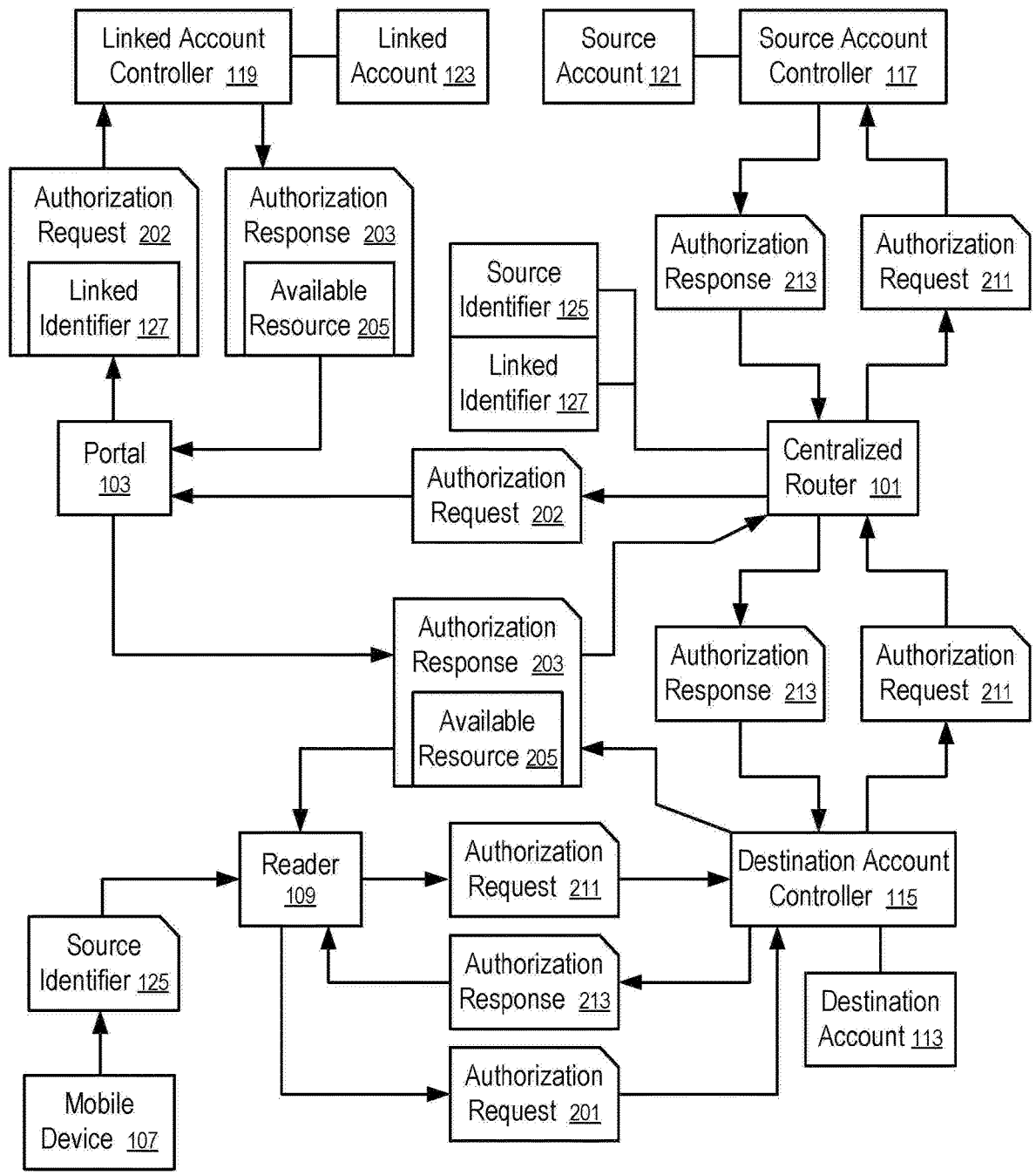

FIG. 4 shows an embodiment in which the reader (109) communicates the first authorization request (201) and its associated authorization response (203) via the destination account controller (115), while the portal (103) is used to communicate with the linked account controller (119) via a connection over the Internet.

In FIG. 4, after the mobile device (107) presents the source identifier (125) to the reader (109) to initiate a transfer of resources, the reader (109) sends a first authorization request (201) to the destination account controller (115), in a way as a third authorization request (211) is transmitted to the destination account controller (115). The first authorization request (201) identifies the source identifier (125). The destination account controller (115) transmits the authorization request (201) to the centralized router (101).

In FIG. 4, based on the data linking the source identifier (125) and the linked identifier (127), the centralized router (101) translates the first authorization request (201) to a second authorization request (202) that identifies the linked identifier (127) and routes the second authorization request (202) via the portal (103) to the linked account controller (119) that controls the linked account (123) identified by the linked identifier (127).

Based on a predetermined set of rules, the linked account controller (119) provides an authorization response (203) that identifies the available resource (205) in the linked account (123). The authorization response (203) authorizes the transfer of the available resource (205) from the linked account (123) to the destination account (113) associated with the reader (109) having the reader ID (111) and connected to the destination account controller (115).

In FIG. 4, the portal (103) routes the authorization response (203) back to the reader (109) via the centralized router (101) and the destination account controller (115).

Based on the identification of the available resource (205) in the authorization response (203) from the linked account controller (119), the reader (109) determines a requested resource (207) and generates a third authorization request (211) transmitted to the destination account controller (115). The third authorization request (211) identifies the requested resource (207) and the source identifier (125) received from the mobile device (107). The third authorization request (211) is generated by the reader (109) in response to the authorization response (203) without reading the mobile device (107) again.

The destination account controller (115) routes the authorization request (211), via the centralized router (101), to the source account controller (117), for an authorization response (213) made by the source account controller (117) controlling the source account (121) identified by the source identifier (125).

The centralized router (101) routes the authorization request (211) received from the source account controller (117) back to the reader (109) via the destination account controller (115).

Figure 5:
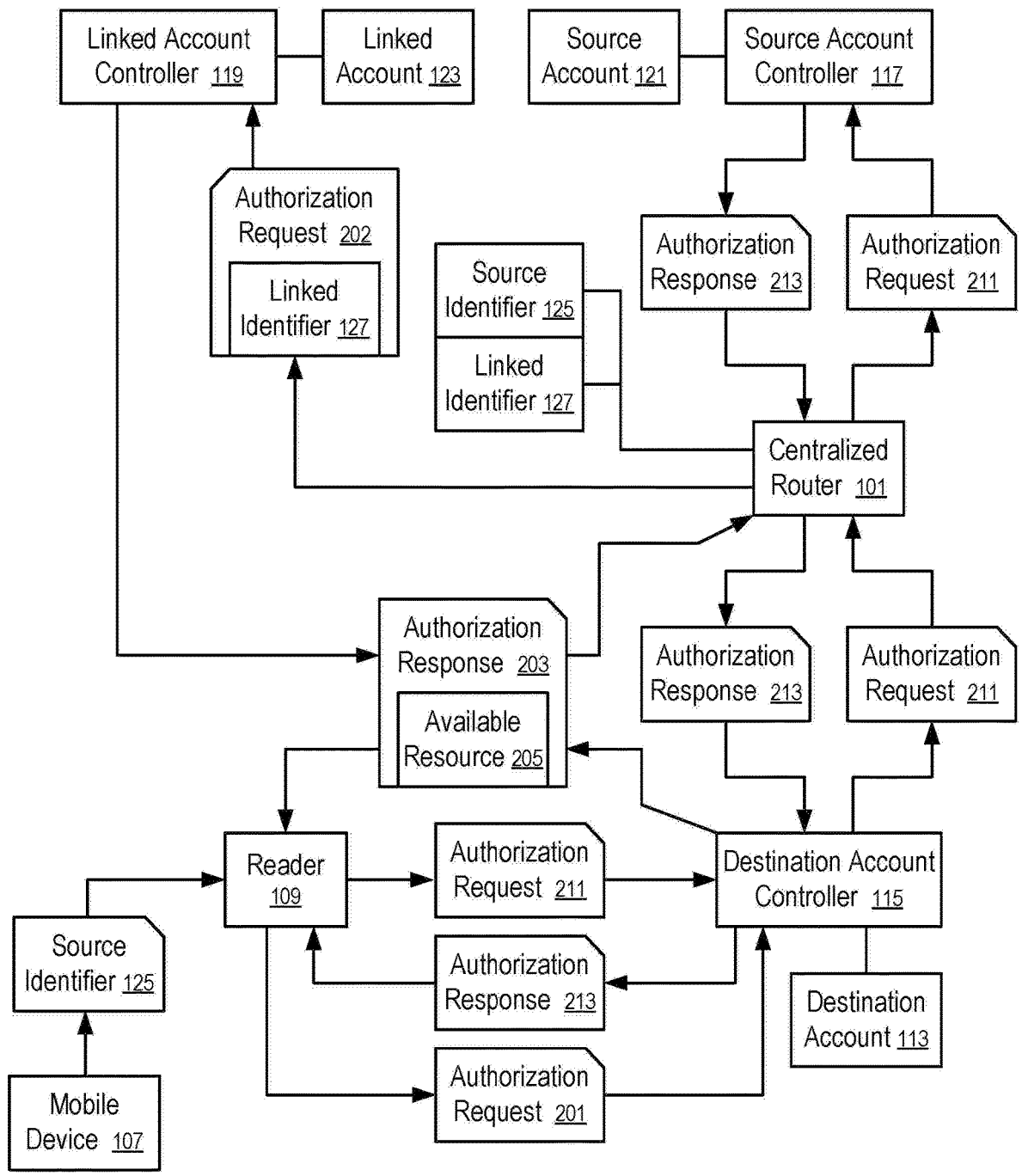

FIG. 5 shows an embodiment in which the linked account controller (119) is connected to the centralized router (101) in a way a source account controller (117) is connected to the centralized router (101). Thus, the second authorization request (202) and its response (203) can be routed through the centralized router (101) without using the portal (103).

In FIG. 5, after the mobile device (107) presents the source identifier (125) to the reader (109) to initiate a transfer of resources, the reader (109) sends a first authorization request (201) to the destination account controller (115), in a way as a third authorization request (211) is transmitted to the destination account controller (115). The first authorization request (201) identifies the source identifier (125). The destination account controller (115) transmits the authorization request (201) to the centralized router (101).

In FIG. 5, based on the data linking the source identifier (125) and the linked identifier (127), the centralized router (101) translates the first authorization request (201) to a second authorization request (202) that identifies the linked identifier (127) and routes the second authorization request (202) to the linked account controller (119) that controls the linked account (123) identified by the linked identifier (127).

Based on a predetermined set of rules, the linked account controller (119) provides an authorization response (203) that identifies the available resource (205) in the linked account (123). The authorization response (203) authorizes the transfer of the available resource (205) from the linked account (123) to the destination account (113) associated with the reader (109) having the reader ID (111) and connected to the destination account controller (115).

In FIG. 5, the centralized router (101) receives the authorization response (203) from the linked account controller (119) (e.g., via a dedicated secure connection) and routes the authorization response (203) back to the reader (109) via the destination account controller (115).

Based on the identification of the available resource (205) in the authorization response (203) from the linked account controller (119), the reader (109) determines a requested resource (207) and generates a third authorization request (211) transmitted to the destination account controller (115). The third authorization request (211) identifies the requested resource (207) and the source identifier (125) received from the mobile device (107). The third authorization request (211) is generated by the reader (109) in response to the authorization response (203) without reading the mobile device (107) again.

The destination account controller (115) routes the authorization request (211), via the centralized router (101), to the source account controller (117), for an authorization response (213) made by the source account controller (117) controlling the source account (121) identified by the source identifier (125).

The centralized router (101) routes the authorization request (211) received from the source account controller (117) back to the reader (109) via the destination account controller (115).

Thus, in FIGS. 2-5, after a single communication interaction between the reader (109) and the mobile device (107) to initiate a transfer using the source identifier (125), the communication protocol allows the authorization of the transfer of resources from both the linked account (123) and the source account (121).

In some embodiments, the reader (109) may present the available resource (205) and receive a user input to accept or reject the transfer of the available resource (205) from the linked account (123) as part of the transfer of resources from the source account (121) identified by the source identifier (125). The requested resources (207) is then computed based on the user input in connection with the available resource (205) identified by the linked account controller (119).

FIGS. 2-5 illustrate examples of linking a source identifier (125) with a linked identifier (127). In other examples, the source identifier (125) can be linked with a plurality of linked identifiers (127) of different linked accounts (123). The reader (109) may repeatedly generate authorization requests for transfer from the source account (121) identified by the source identifier (125) and the portal (103) and/or the centralized router (101) may repeatedly map the requests to corresponding linked accounts (123) identified the associated linked identifiers (127), until the linked accounts have available resources and the last authorization request is routed to the responsible source account controller (117) for the source account (121) identified by the source identifier (125).

The communication techniques discussed in FIGS. 1-5 can be used in many applications. For example, the transfer of resources can have applications in the transfer of digital tokens, digital rights, payment currencies, loyalty rewards, etc. For example, the transfer of resources can have applications in the transfer of payment currencies in terms of financial currencies from payment accounts as source accounts and reward currencies from reward accounts as linked accounts. In some embodiments, the linked accounts are also payment accounts.

For example, in one embodiment, a transaction handler of an electronic payment processing network can be implemented as the centralized router (101). Acquirer processors controlling the merchant accounts can be implemented as the destination account controllers (115) of the destination accounts (113); and the issuer processors controlling the consumer payment accounts can be implemented as the source account controllers (117) of the source accounts (121). Loyalty reward hosts controlling the reward accounts can be implemented as the linked account controller (119) of the linked accounts (123). The transaction terminals of merchants can be implemented as the readers (109) configured to read payment devices, or account identification devices, implemented as the mobile device (107) illustrated in FIG. 1.

For example, a system and method can be provided to allow loyalty points redemption at POS terminal using the communication protocols discussed above. The method operates by using POS integration to process point redemption. When a payment transaction is initiated at the POS terminal, the POS terminal visits a portal of a transaction handler to obtain rewards authorization. A rewards broker at transaction handler communicates with the issuer or reward host to obtain authorization of a points redemption deal and causes the POS terminal to prompt the user to accept the deal. Based on the response of the user, the POS terminal generates a further authorization request for a transaction in the payment account for the remaining balance of the transaction. During clearing and settlement, the loyalty broker, the portal, or the POS terminal may push the transaction to the acquirer processor. Thus, a user can be presented with the option to use a just-in-time point redemption deal, communicated via out of band communication channel with the transaction handler, and seamlessly charge the remaining balance to the payment account, as if the authorization for the transaction were performed once from the user point of view.

In one embodiment, the first authorization request (201) for a transaction in the payment account results in a pre-authorization of a point redemption deal that provides a predetermined amount of benefit, which corresponds to the available resource (205) identified in the authorization response (203). The further authorization request (211) for a transaction in the payment account is generated automatically by the POS terminal for a modified transaction amount in the same payment account.

Figure 6:
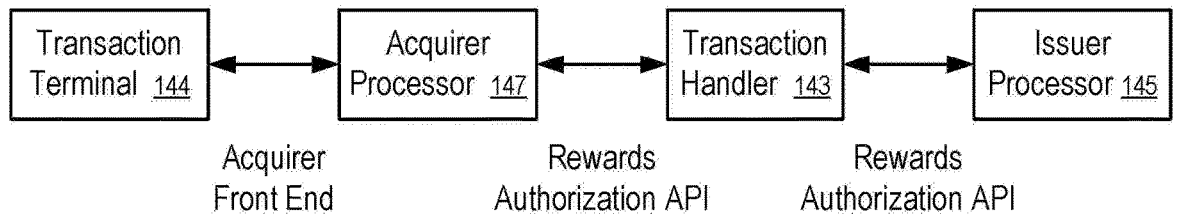
FIGS. 6-9 illustrate the applications of communication techniques to process reward redemption according to some embodiments.

In one embodiment, the first authorization request (201) may be transmitted from the transaction terminal (105) to a transaction handler (143) via an acquirer processor (147) in a way as illustrated in FIG. 6 (or FIG. 5). In FIG. 6, the issuer processor (145) corresponds to a linked account controller (119) in FIG. 5, the transaction handler (143) to a centralized router (101), the acquirer processor (147) to a destination account controller (115), and the transaction terminal (144) to a reader (109).

Figure 7:
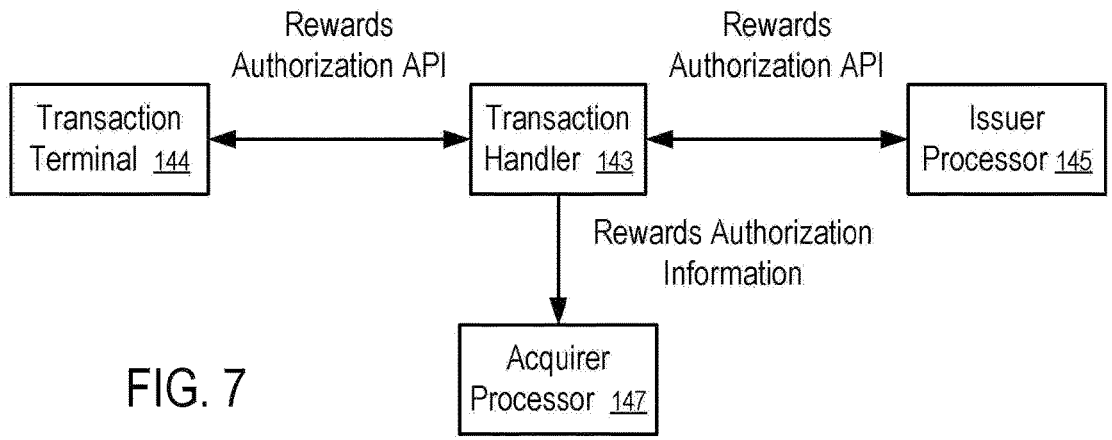

Alternatively, as illustrated in FIG. 7, the first authorization request (201) may be transmitted from the transaction terminal (144) to a transaction handler (143) without going through the acquirer processor (147) of the merchant; and the transaction handler (143) may push the reward authorization information to the acquirer processor (147). For example, the transaction terminal (144) may communicate the first authorization request (201) to the transaction handler (143) via a portal (103), as illustrated in U.S. Pat. App. Pub. No. 2013/0268333, the disclosure of which is hereby incorporated herein by reference. For example, the techniques of FIGS. 2-4 can be used to receive the first authorization request (201) in the portal (103) for further routing to the issuer processor (145), or a reward host, implemented as the linked account controller (119) illustrated in FIGS. 2-4.

Figure 8:
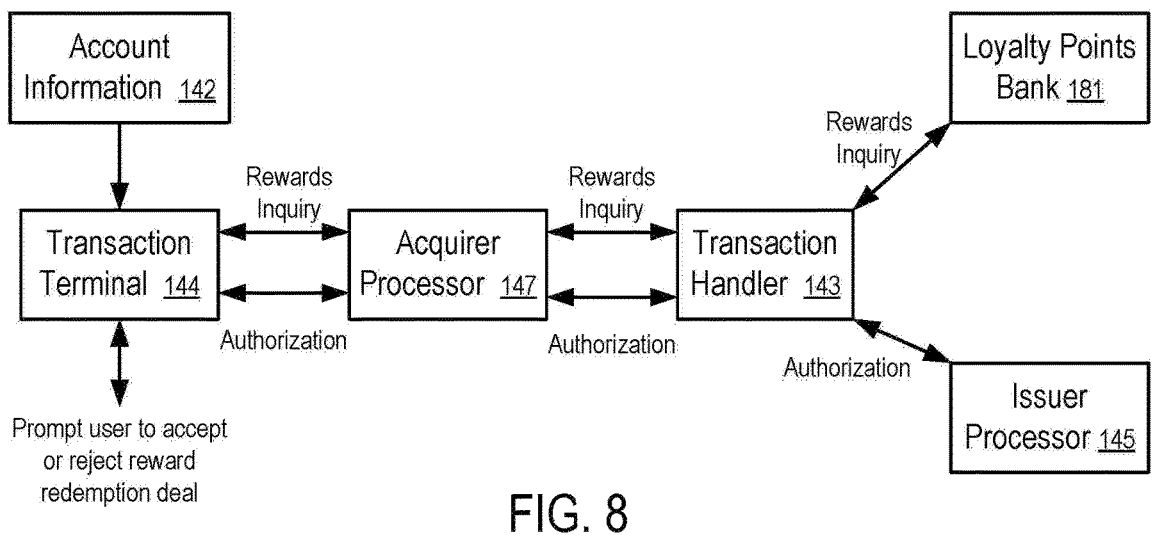

In FIG. 8, after the account information (142) identifying a consumer payment account (146) is provided to the transaction terminal (144) to initiate a payment transaction in the consumer account (146) identified by the account information (142), the transaction terminal (144) is configured to initiate a rewards inquiry to the acquirer processor (147) using an acquirer front end. The acquirer processor (147) uses a rewards authorization API of the transaction handler (143) to perform rewards inquiry. The transaction handler (143) uses a rewards authorization API to communicate with the loyalty points bank (181) (e.g., as a linked account controller (119)) for rewards inquirer.

In FIG. 8, the rewards inquiry provides the loyalty reward balance associated with the account information (142) and/or the consumer account (146) and/or provides a predetermined rewards redemption deal as the available resource (205).

In FIG. 8, the rewards inquiry provides an authorization for the redemption up to the balance of the loyalty reward of the user, or the predetermined rewards redemption deal. Alternative, a response to the rewards inquirer provides the balance information, but no authorization.

In FIG. 8, after the transaction terminal (144) obtains the response to the rewards inquiry, the transaction terminal (144) prompts the user (101) to accept or reject the reward redemption deal. In some embodiments, the user (101) may specify an amount of redeemed loyalty rewards.

If the rewards inquiry does not provides an authorization for the redemption, the transaction terminal (105) may transmit an authorization request for the redemption of the rewards requested by the user.

In FIG. 8, if the rewards inquiry provides an authorization for the redemption that is accepted by the user and the redeemed rewards is insufficient to match the transaction amount for the payment transaction, the transaction terminal (144) is configured to automatically generate a further authorization request (211) for the remaining balance of the transaction in the consumer account (146) identified by the account information (142). The transaction handler (143) routes the further authorization request (211) to the issuer processor (145), as the centralized router (101) routing the authorization request (211) to the source account controller (117) in FIGS. 2 and 5.

Figure 9:
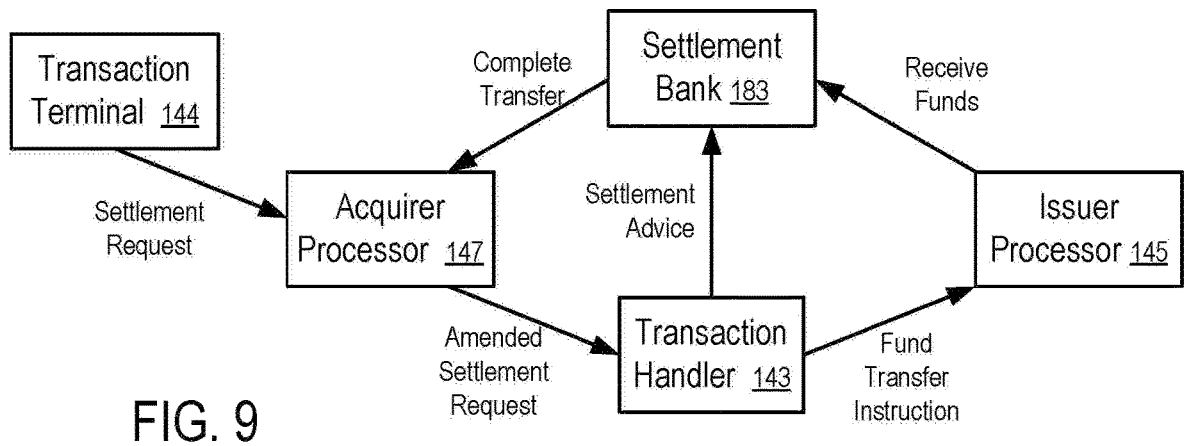

FIG. 9 illustrates a settlement process in which acquirer process (147) is configured to amend a settlement request received from the transaction terminal (144), prior to transmitting the amended settlement request to the transaction handler (143). In one embodiment, the acquirer processor (147) is configured to amend the account funding source based on issuer rewards program to generate the amended settlement request. For example, the acquirer processor may substitute the account information (142) with the funding source of the loyalty rewards to settle the portion of the transaction that is funded by the redeemed rewards. In some embodiments, when the authorization response (203) identifying the available resource (205) (e.g., available redemption deal, or reward balance available for redemption) is propagated through the acquirer processor (147), e.g., in a way as being propagated through the destination account controller (115) as illustrated in FIGS. 3-5, the acquirer processor (147) can translate a single settlement request into a plurality of settlement requests corresponding to the plurality of authorization responses (e.g., 203 and 213) for transferring from the linked account (123) and the source account (121). The transaction handler (143) provides settlement advice to the settlement bank (183) to receive funds from the issuer processor (145) and complete transfer to the merchant account controlled by the acquirer processor (147).

Alternatively, the transaction terminal (105) or the transaction handler (103) may amend the settlement request in a similar manner.

In one embodiment, a system and method is configured to: receive an authorization request for a transaction in a payment account; in response to the authorization request, identify a deal to redeem an amount of loyalty benefit applicable to the transaction; provide a pre-authorization of the deal as a response to the authorization request, the pre-authorization causing a POS terminal to prompt a user to provide an input to accept or reject the deal; receive a subsequent authorization request for the transaction, the subsequent authorization identifying a transaction amount in the payment account based on a user response received at the POS terminal; and communicate with an issuer processor of the payment account for an authorization of the transaction amount.

Variations

Some embodiments use more or fewer components than those illustrated in the figures. For example, in some embodiments, the destination account controllers (115), the centralized router (101), and the source account controllers (117) may be operated by the same entity within an intranet. In one embodiment, the destination account controllers (115), the centralized router (101), and the source account controllers (117) may be implemented in the same set of one or more computers.

In some embodiments, the portal (103) is implemented using the same set of one or more computers of the centralized router (101).

Transaction Processing

Figure 10:
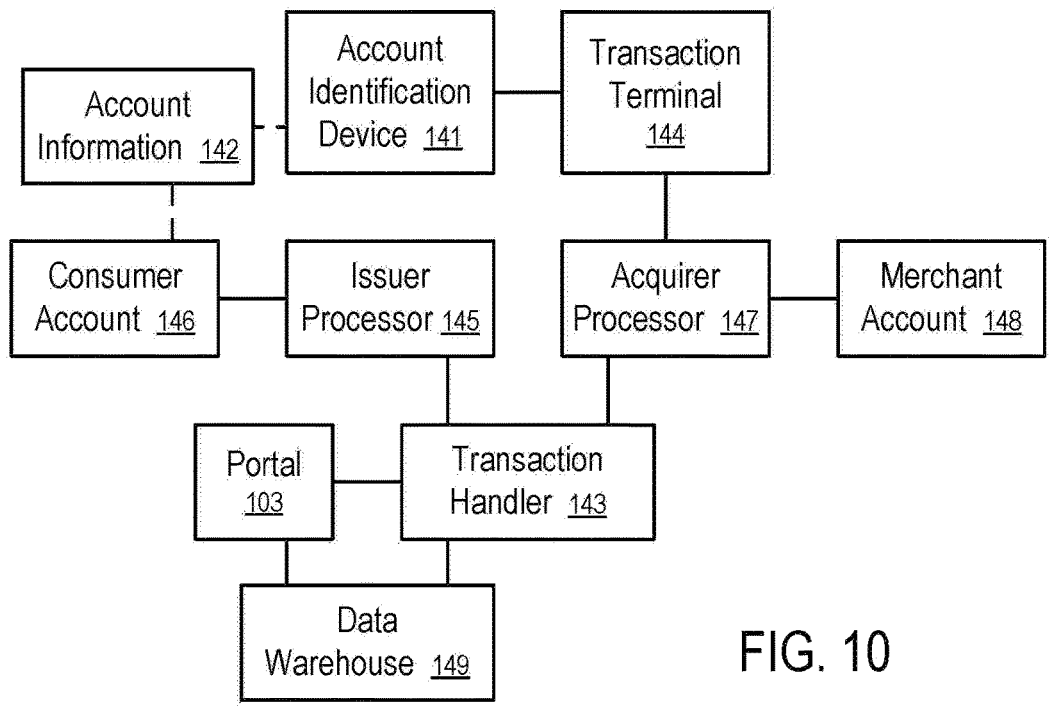
FIG. 10 shows a payment processing system in which the communication techniques can be used according to one embodiment.

FIG. 10 shows a payment processing system in which the communication techniques can be used according to one embodiment.

In FIG. 10, the transaction handler (143) is coupled between an issuer processor (145) and an acquirer processor (147) to facilitate authorization and settlement of transactions between a consumer account (146) and a merchant account (148), in a way that the centralized router (101) is coupled between the destination account controllers (115) and the source account controllers (117). The transaction handler (143) records the transactions in the data warehouse (149). The portal (103) is coupled to the data warehouse (149) to provide an out-of-band communication access (e.g., via the Internet). The portal (103) may be implemented as a web portal, a telephone gateway, a file/data server, etc.

In FIG. 10, the transaction terminal (144) initiates the transaction for a user (e.g., a customer) for processing by the transaction handler (143). The transaction handler (143) processes the transaction and stores transaction data about the transaction in connection with account information (142). The account information (142) may further include data about the user, collected from issuers or merchants, and/or other sources, such as social networks, credit bureaus, merchant provided information, address information, etc. In one embodiment, a transaction may be initiated by a server (e.g., based on a stored schedule for recurrent payments).

In FIG. 10, the consumer account (146) is under the control of the issuer processor (145). The consumer account (146) may be owned by an individual or an organization such as a business, a school, etc. The consumer account (146) may be a credit account, a debit account, or a stored value account. The issuer may provide the consumer (e.g., user) an account identification device (141) as the mobile device (107) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing the account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (144) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (144) may require contact with the account identification device (141) to read the account information (142) (e.g., by reading the magnetic strip of a card with a magnetic strip reader).

The transaction terminal (144) is configured to transmit an authorization request message to the acquirer processor (147). The authorization request includes the account information (142), an amount of payment, and information about the merchant (e.g., an indication of the merchant account (148)). The acquirer processor (147) asks the transaction handler (143) to process the authorization request based on the account information (142) received in the transaction terminal (144). The transaction handler (143) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (143), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (144) of one embodiment is configured to interact with the account identification device (141) to obtain the account information (142) that identifies the consumer account (146) and/or the issuer processor (145). The transaction terminal (144) communicates with the acquirer processor (147) that controls the merchant account (148) of a merchant. The transaction terminal (144) may communicate with the acquirer processor (147) via a data communication connection, such as a telephone connection, an Internet connection, etc. The acquirer processor (147) is to collect payments for deposit into the merchant account (148) on behalf of the merchant.

In one embodiment, the transaction terminal (144) is a POS terminal at a traditional, offline, "brick and mortar" retail store. In another embodiment, the transaction terminal (144) is an online server that receives the account information (142) of the consumer account (146) from the user through a web connection. In one embodiment, the user may provide account information (142) through a telephone call, via verbal communications with a representative of the merchant, and the representative enters the account information (142) into the transaction terminal (144) to initiate the transaction.

In one embodiment, the account information (142) can be entered directly into the transaction terminal (144) to make payments from the consumer account (146) without having to physically present the account identification device (141). When a transaction is initiated without physically presenting the account identification device (141), the transaction is classified as a "card-not-present" (CNP) transaction.

In general, the issuer processor (145) may control more than one consumer account (146), the acquirer processor (147) may control more than one merchant account (148), and the transaction handler (143) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (143), the issuer processor (145), the acquirer processor (147), the transaction terminal (144), the portal (103), and other devices and/or services accessing the portal (103) are connected via communications networks, such as local area networks, cellular telecommunications networks, wireless wide area networks, wireless local area networks, an intranet, and the Internet. Dedicated communication channels may be used between the transaction handler (143) and the issuer processor (145), between the transaction handler (143) and the acquirer processor (147), and/or between the portal (103) and the transaction handler (143).

In FIG. 10, the transaction handler (143) uses the data warehouse (149) to store the records about the transactions, such as the transaction records or the transaction data.

Typically, the transaction handler (143) is implemented using a powerful computer, or cluster of computers functioning as a unit, controlled by instructions stored on a computer-readable medium. The transaction handler (143) is configured to support and deliver authorization services, exception file services, and clearing and settlement services. The transaction handler (143) has a subsystem to process authorization requests and another subsystem to perform clearing and settlement services. The transaction handler (143) is configured to process different types of transactions, such credit card transactions, debit card transactions, prepaid card transactions, and other types of commercial transactions. The transaction handler (143) interconnects the issuer processors (e.g., 145) and the acquirer processor (e.g., 147) to facilitate payment communications.

In FIG. 10, the transaction terminal (144) is configured to submit the authorized transactions to the acquirer processor (147) for settlement. The amount for the settlement may be different from the amount specified in the authorization request. The transaction handler (143) is coupled between the issuer processor (145) and the acquirer processor (147) to facilitate the clearing and settling of the transaction. Clearing includes the exchange of financial information between the issuer processor (145) and the acquirer processor (147), and settlement includes the exchange of funds.

In FIG. 10, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (143) to coordinate the transfer of funds for the transaction. The funds can be transferred electronically.

The transaction terminal (144) may submit a transaction directly for settlement, without having to separately submit an authorization request.

In one embodiment, the portal (103) provides a user interface to allow the user to organize the transactions in one or more consumer accounts (146) of the user with one or more issuers. The user may organize the transactions using information and/or categories identified in the transaction records, such as merchant category, transaction date, amount, etc. Examples and techniques in one embodiment are provided in U.S. Pat. App. Pub. No. 2007/0055597, and entitled "Method and System for Manipulating Purchase Information," the disclosure of which is hereby incorporated herein by reference.

Transaction Terminal

Figure 11:
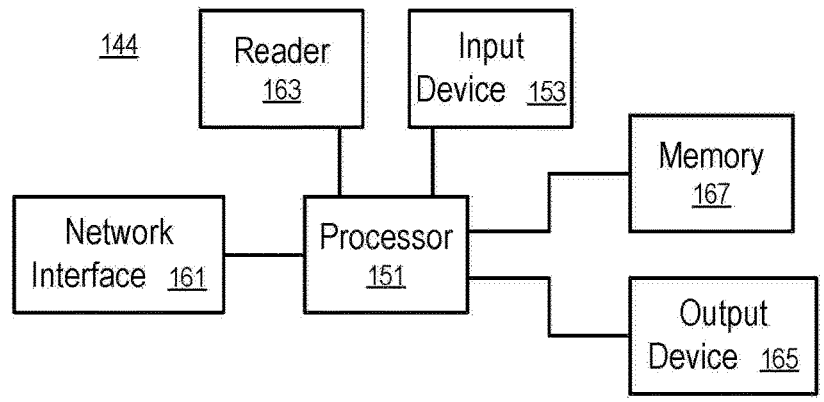
FIG. 11 illustrates a transaction terminal according to one embodiment.

FIG. 11 illustrates a transaction terminal (144) according to one embodiment.

The transaction terminal (144) illustrated in FIG. 11 can be used in various systems discussed in connection with other figures of the present disclosure. In FIG. 11, the transaction terminal (144) is configured to interact with the account identification device (141) to obtain the account information (142) about the consumer account (146).

In one embodiment, the transaction terminal (144) includes a memory (167) coupled to a processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (144) without the physical presence of the account identification device (141). The input device (153) can be configured to provide further information to initiate a transaction, such as a personal identification number (PIN), password, zip code, etc., that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (144) to send an authorization request message to the acquirer processor (147) to initiate a transaction. The transaction terminal (144) may or may not send a separate request for the clearing and settling of the transaction. The instructions stored in the memory (167) are also configured to cause the transaction terminal (144) to perform other types of functions discussed in this description.

In one embodiment, a transaction terminal (144) may have fewer components than those illustrated in FIG. 11. For example, in one embodiment, the transaction terminal (144) is configured for "card-not-present" transactions, and the transaction terminal (144) does not have the reader (163).

In one embodiment, the transaction terminal (144) may have more components than those illustrated in FIG. 11. For example, in one embodiment, the transaction terminal (144) is an ATM machine, which includes components to dispense cash under certain conditions.

Account Identification Device

Figure 12:
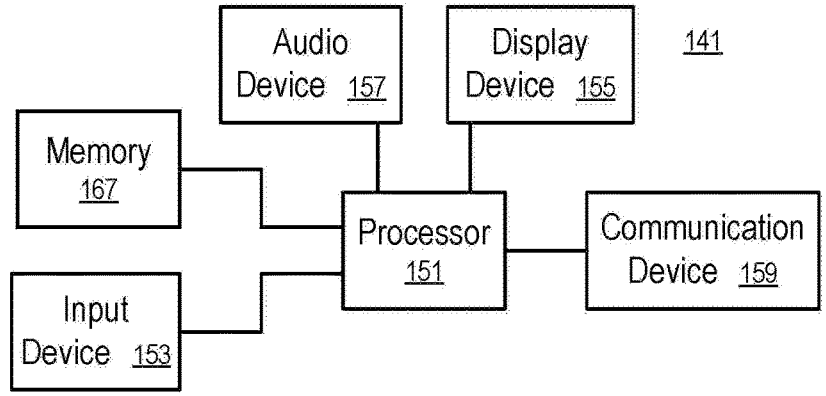
FIG. 12 illustrates an account identifying device according to one embodiment.

FIG. 12 illustrates an account identifying device according to one embodiment. In FIG. 12, the account identification device (141) is configured to carry account information (142) that identifies the consumer account (146).

In one embodiment, the account identification device (141) includes the memory (167) coupled to the processor (151), which controls the operations of a communication device (159), the input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account (146) among a plurality of consumer accounts (146) controlled by the issuer processor (145). The account information (142) may include an expiration date of the account identification device (141), the name of the consumer holding the consumer account (146), and/or an identifier identifying the account identification device (141) among a plurality of account identification devices (141) associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory (167) includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently the most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141), and the audio device (157) and the display device (155) may present status information and/or other information, such as advertisements or offers. The account identification device (141) may include further components that are not shown in FIG. 12, such as a cellular communications subsystem.

In one embodiment, the communication device (159) may access the account information (142) stored on the memory (167) without going through the processor (151).

In one embodiment, the account identification device (141) has fewer components than those illustrated in FIG. 12. For example, the account identification device (141) does not have the input device (153), the audio device (157) and the display device (155) in one embodiment, and in another embodiment, the account identification device (141) does not have components (151-159).

For example, in one embodiment, the account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide the account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine-readable medium containing the account information (142).

Hardware

In one embodiment, a computing apparatus is configured to include some of the components of systems illustrated in various figures, such as the mobile device (107), the reader (109), the destination account controller (115), the centralized router (101), the data storage (105), the portal (103), the source account controller (117), the linked account controller (119), the transaction handler (143), the data warehouse (149), the issuer processor (145), the acquirer processor (147), the transaction terminal (144), the loyalty points bank (181), the settlement bank (183), etc.

Figure 13:
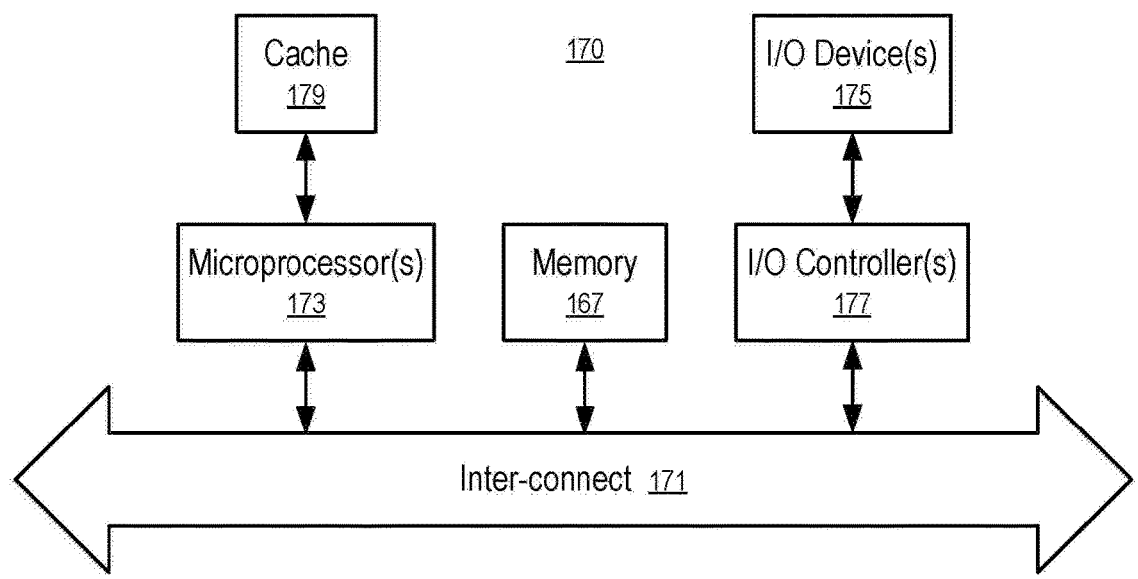
FIG. 13 illustrates a data processing system according to one embodiment.

In one embodiment, at least some of the components can be implemented as a computer system, such as a data processing system (170) illustrated in FIG. 13. Some of the components may share hardware or be combined on a computer system. In one embodiment, a network of computers can be used to implement one or more of the components.

In one embodiment, the transaction handler (143) is a payment processing system, or a payment card processor, such as a card processor for credit cards, debit cards, etc.

FIG. 13 illustrates a data processing system according to one embodiment. While FIG. 13 illustrates various components of a computer system, it is not intended to represent any particular architecture or manner of interconnecting the components. One embodiment may use other systems that have fewer or more components than those shown in FIG. 13.

In FIG. 13, the data processing system (170) includes an inter-connect (171) (e.g., bus and system core logic), which interconnects the microprocessor(s) (173) and the memory (167). The microprocessor (173) is coupled to cache memory (179) in the example of FIG. 13.

In one embodiment, the inter-connect (171) interconnects the microprocessor(s) (173) and the memory (167) together and also interconnects them to input/output (I/O) device(s) (175) via I/O controller(s) (177). The I/O devices (175) may include the display device (155) and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) that requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from the execution of the code/instructions by a processor, such as a microprocessor.

Alternatively, or in combination, the functions and operations as described here can be implemented using special purpose circuitry, with or without software instructions, such as Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium can be used to store software and data that, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable media include but are not limited to recordable and non-recordable type media, such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine-readable medium and are not configured to store instructions.

In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment, and, such references mean at least one.

The use of headings herein is merely provided for ease of reference and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described that may be exhibited by one embodiment and not by others. Similarly, various requirements are described that may be requirements for one embodiment, but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system to implement a communication protocol, comprising:

a portal having a communication connection between the portal and a reader that is connected to a destination account controller, wherein the communication connection does not go through the destination account controller controlling a destination account associated with the reader, the portal configured to:

receive, through the communication connection, a first authorization request identifying a source account identifier, in response to the reader obtaining the source account identifier from a mobile device;

transmit, in response to the first authorization request and based on data linking the source account identifier and a linked identifier, a second authorization request to a linked account controller controlling a linked account identified by the linked identifier, the second authorization request including the linked account identifier;

receive, from the linked account controller, a first response to the second authorization request, the first response identifying an available resource for transferring from the linked account to the destination account; and communicate, the first response to the reader to cause the reader to generate a third authorization request based on the available resource identified in the first response and transmit the third authorization request, the third authorization request including the source account identifier and a requested resource to be transferred to the destination account; and a centralized router configured to:

receive the third authorization request from the reader via the destination account controller;

route the third authorization request to a source account controller that controls a source account identified by the source account identifier contained in the third authorization request; and route a second response to the third authorization request from the source account controller to the reader via the destination account controller.

2. The computing system of claim 1, wherein the first response from the portal to the reader causes the reader to generate the third authorization request without obtaining the source account identifier again from the mobile device after the first authorization request is transmitted to the portal.

3. The computing system of claim 2, wherein the first response is communicated by the portal to the reader using the communication connection that does not go through the destination account controller.

4. The computing system of claim 1, wherein the communication connection through which the first authorization request is communicated from the reader to the portal is established via internet.

5. The computing system of claim 1, wherein the first response is communicated to the reader via the destination account controller.

6. The computing system of claim 5, wherein the portal causes the centralized router to route the first response to the destination account controller which further transmits the first response to the reader.

7. The computing system of claim 6, wherein the computing system identifies the destination account controller based on an identifier of the reader provided in the first authorization request and routes the first response to the destination account controller via the centralized router.

8. The computing system of claim 1, wherein the first response authorizes a transfer of the available resource identified in the first response and causes the reader to prompt for an input to accept or reject the transfer of the available resource from the linked account to the destination account associated with the reader.

9. The computing system of claim 8, wherein the first response causes the reader to determine the requested resource identified in the third authorization request, based on the available resource identified in the first response and the input to accept or reject the transfer of the available resource from the linked account to the destination account associated with the reader.

10. A non-transitory computer storage medium storing instructions configured to instruct a computing system to implement a communication protocol, the communication protocol comprising:

establishing a communication connection between a portal and a reader that is connected to a destination account controller, wherein the communication connection does not go through the destination account controller controlling a destination account associated with the reader;
receiving, in the portal through the communication connection from the reader, a first authorization request identifying a source account identifier obtained by the reader from a mobile device;
transmitting, by the portal in response to the first authorization request and based on data linking the source account identifier and a linked identifier, a second authorization request to a linked account controller controlling a linked account identified by the linked identifier, the second authorization request including the linked account identifier;
receiving, by the portal from the linked account controller, a first response to the second authorization request, the first response identifying an available resource for transferring from the linked account to the destination account; and
communicating, by the portal, the first response to the reader to cause the reader to generate a third authorization request based on the available resource identified in the first response and transmit the third authorization request, the third authorization request including the source identifier and a requested resource to be transferred to the destination account;
receiving, by a centralized router, the third authorization request from the reader via the destination account controller;
routing, by the centralized router, the third authorization request to a source account controller that controls a source account identified by the source identifier contained in the third authorization request; and
routing, by the centralized router, a second response to the third authorization request from the source account controller to the reader via the destination account controller.

11. A method for implementing a communication protocol, the method comprising:
establishing a communication connection between a portal and a reader that is connected to a destination account controller, wherein the communication connection does not go through the destination account controller controlling a destination account associated with the reader;
receiving, in the portal through the communication connection from the reader, a first authorization request identifying a source account identifier obtained by the reader from a mobile device;
transmitting, by the portal in response to the first authorization request and based on data linking the source account identifier and a linked identifier, a second authorization request to a linked account controller controlling a linked account identified by the linked identifier, the second authorization request including the linked account identifier;
receiving, by the portal from the linked account controller, a first response to the second authorization request, the first response identifying an available resource for transferring from the linked account to the destination account; and
communicating, by the portal, the first response to the reader to cause the reader to generate a third authorization request based on the available resource identified in the first response and transmit the third authorization request, the third authorization request including the source account identifier and a requested resource to be transferred to the destination account;
receiving, by a centralized router, the third authorization request from the reader via the destination account controller;
routing, by the centralized router, the third authorization request to a source account controller that controls a source account identified by the source identifier contained in the third authorization request; and
routing, by the centralized router, a second response to the third authorization request from the source account controller to the reader via that destination account controller.

12. The method of claim 11, wherein the first response authorizes the destination account controller to initiate a transfer of the available resource identified in the first response from the linked account to the destination account.

13. The method of claim 12, wherein the transfer is in response to the destination account controller receiving a transfer request from the reader identifying the source account identifier.

14. The method of claim 13, wherein the first response causes the reader to prompt for an input to accept or reject the transfer of the available resource from the linked account to the destination account associated with the reader; and the transfer request is in response to an input accepting the transfer.

15. The method of claim 14, wherein the requested resource is determined based on the available resource identified in the first response and the input accepting the transfer of the available resource from the linked account to the destination account.

16. The method of claim 11, wherein the first response causes the reader to generate the third authorization request without obtaining the source account identifier again from the mobile device after the first authorization request is transmitted to the portal.

17. The method of claim 11, wherein the first response is communicated to the reader via the destination account controller.

18. The method of claim 17, wherein the communicating of the first response to the reader includes:
providing the first response to the centralized router to cause the centralized router to route the first response to the destination account controller, wherein the destination account controller provides the first response to the reader.

19. The method of claim 18, wherein the destination account controller is identified for routing the first response to the reader based on an identifier of the reader provided in the first authorization request.

20. The method of claim 11, wherein the first response from the portal to the reader causes the reader to generate the third authorization request without obtaining the source account identifier again from the mobile device after the first authorization request is transmitted to the portal.

* * * * *